United States Patent [19]

Plice

[11] Patent Number: 4,514,598

[45] Date of Patent: Apr. 30, 1985

[54] MICROPHONE SHOCK-MOUNTING APPARATUS

[75] Inventor: Gerald W. Plice, Morton Grove, Ill.

[73] Assignee: Shure Brothers, Inc., Evanston, Ill.

[21] Appl. No.: 515,614

[22] Filed: Jul. 20, 1983

[51] Int. Cl.[3] .......................... H04R 1/02; H04M 1/04

[52] U.S. Cl. ................................ 179/146 R; 179/147; 179/153; 179/180; 248/104; 248/634

[58] Field of Search .................... 179/146 R, 147, 152, 179/153, 180, 187, 178, 154; 381/87; 181/207; 248/102-106, 634

[56] References Cited

U.S. PATENT DOCUMENTS

| | | | |
|---|---|---|---|
| D. 223,579 | 5/1972 | Plice | D26/14 |
| 2,342,051 | 2/1944 | Hyams | 248/106 |
| 2,776,462 | 1/1957 | Burroughs | 179/146 R |
| 2,784,261 | 3/1957 | Anklesaria | 248/103 |
| 3,222,020 | 12/1965 | Rea | 248/106 |
| 3,452,955 | 7/1969 | Hartwig | 179/146 R |
| 3,653,625 | 4/1972 | Plice | 179/147 |
| 3,924,083 | 12/1975 | Hagey | 179/178 |
| 4,315,654 | 2/1982 | Crook | 248/102 |
| 4,396,807 | 8/1983 | Brewer | 179/146 R |

OTHER PUBLICATIONS

Brochure for Audio-Technica Microphones.

Terry R. Locke, "An Effective Mechanopneumatic Shock Mount for a Dynamic Microphone," 26, Journal of the Audio Engineering Society, 623 (Sep. 1978).

Gerald W. Plice, "Microphone Accessory Shock Mount for Stand or Boom Use," 19, Journal of the Audio Engineering Society, 133 (Feb. 1971).

Brochure on Electro-Voice Model 313A Shock Mount Microphone Clamp.

*Primary Examiner*—Gene Z. Rubinson

*Assistant Examiner*—Danita R. Byrd

*Attorney, Agent, or Firm*—Allegretti, Newitt, Witcoff & McAndrews, Ltd.

[57] ABSTRACT

A shock-mounting apparatus designed for receiving and holding a microphone so as to isolate the microphone from surrounding structure-borne environmental vibration. The apparatus comprises a cradle that flexes when opening to receive the microphone and then closes firmly around the microphone body to hold it in place. The cradle also permits the microphone to be received into and removed from the shock-mounting apparatus without requiring disconnection from the signal output cable.

4 Claims, 5 Drawing Figures

MICROPHONE SHOCK-MOUNTING APPARATUS

BACKGROUND OF THE INVENTION

This invention relates to a shock-mounting apparatus designed for supporting a microphone to isolate the microphone from surrounding environmental vibration.

Microphones with vastly improved sensitivity and response characteristics are continually being developed by the audio industry. One such microphone is the dynamic or moving coil type microphone. This microphone has achieved substantial popularity.

A diaphragm and voice coil form a moving component in the dynamic microphone. A permanent magnetic circuit forms a "stationary" component. The diaphgram and voice coil are suspended in the permanent magnetic circuit. Sound waves vibrate the diaphgram. This vibration causes the voice coil to move axially within the "stationary" magnetic circuit. The voice coil movement induces a voltage in the coil. This voltage is the microphone output.

The dynamic microphone is highly sensitive to vibration. Microphones generally and dynamic microphones in particular are most sensitive to axial vibration. This is primarily due to the relatively large mass of the dynamic microphone diaphragm and voice coil. This large mass contributes to the low-frequency acoustical response of the microphone transducer. Unfortunately, the large mass also makes the dynamic microphone sensitive to unwanted, structure-borne, mechanical vibration.

Transmission of structure-borne vibration to the body of the microphone through its supporting structure induces axial movement of the "stationary" magentic circuit. Because of their large mass and resulting inertia, the diaphragm and voice coil tend to remain at rest while the microphone body moves due to vibration. Under these circumstances, the motion of the microphone body relative to the diaphragm and coil generates an unwanted electrical output.

Isolation of dynamic microphones from mechanical vibration is essential to their best use. The microphones may include internal damping mechanisms or external, shock-mounting apparatuses. An advantage of an external shock-mounting apparatus is compatability with various types of microphones, without change of microphone internal structure.

While external shock-mounting apparatuses have been developed and used, one deficiency or another has limited the usefulness of these prior devices. The framework of some external shock-mounting devices produce spurious resonances and secondary vibrations. Other devices are not compliant enough in the axial direction, which is the main direction of dynamic microphone vibration sensitivity.

One popular shock-mounting apparatus completely encircles the microphone to hold it. Because some microphones have on/off switches on the microphone bodies, a mounting device that encircles a microphone body to support it may obstruct microphone on/off switches. Additionally, a mounting device that encircles the microphone requires that the microphone be disconnected from its signal output cable each time the microphone is inserted into or removed from the mounting device. Consequently, a microphone user cannot quickly transfer the microphone from his or her hand to the mounting device, and cannot make the transfer without temporary loss of the microphone output. Also, many microphone models have permanently attached cables precluding their use in a completely encircling mount.

SUMMARY OF THE INVENTION

The present invention is a shock-mounting apparatus for vibrationally isolating a microphone from structure-borne vibration. The apparatus employs a means for cradling the microphone in a cradling channel. This cradling means defines a flexible slot into the cradling channel that permits a microphone to be received and removed from the shock-mounting apparatus without requiring it to be disconnected from its signal output cable. The microphone shock-mounting apparatus also includes a mounting bracket. The apparatus utilizes compliant means for interconnecting the cradle with the mounting bracket so that the cradle remains substantially isolated from environmental vibration transmitted through the mounting bracket.

Thus, an object of this invention is to overcome the deficiencies of the prior art, and isolate a microphone from vibration while providing for easy, rapid transfer of the microphone to and from a mounting apparatus.

Another object of this invention is to provide a microphone shock-mounting apparatus with a flexible cradle that flexes to receive a microphone and then closes firmly around the microphone body to hold it in place.

Another object of this invention is to provide a microphone shock-mounting apparatus with a mounting bracket that supports both the cradle and the microphone.

A further object is to provide a mounting bracket which swivels to adjust the position of a cradled microphone.

Another, further object of this invention is to provide a microphone shock-mounting apparatus with an isolator that is compliant, connects the mounting bracket with the cradle, provides a padded surface inside the cradle, and substantially isolates the cradle from environmental vibration transmitted through the mounting bracket.

A still further object of this invention is to afford a high degree of isolation from vibration in a compact, economical, and easy to use shock-mounting apparatus.

These and other objects, features and advantages of the invention are a part of the detailed description of the preferred embodiment of the invention, which follows.

BRIEF DESCRIPTION OF THE DRAWING

In the accompanying drawing that forms a part of this specification, the preferred embodiment of the present invention is depicted, and specifically

DETAILED DESCRIPTION OF THE PREFERRED EMBODIMENT

Figure 1:
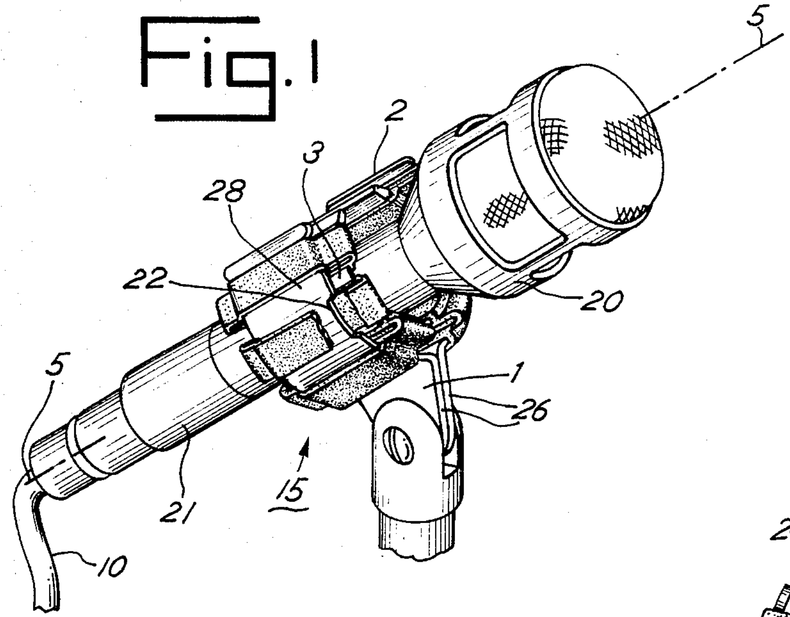
FIG. 1 is a perspective view of the preferred embodiment holding and supporting an illustrative microphone.
Figure 2:
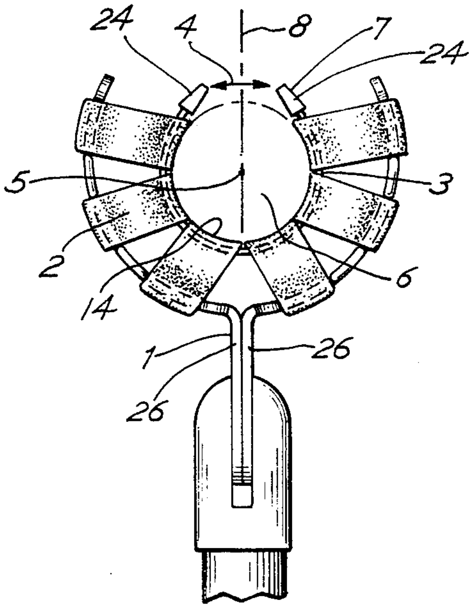
FIG. 2 is an end view of the preferred embodiment.

Referring to FIGS. 1 and 2, a preferred embodiment 15 of the shock-mounting apparatus of the present invention is depicted cradling an illustrative microphone 20. The preferred shock-mounting apparatus 15 includes a mounting bracket 1, a plurality of isolators 2, and a microphone cradle 3. Tips 7 are located on the ends of the microphone cradle 3 and on each side of a slot 4.

The cradle 3 is arcuate, or partially annular, extending about a central axis 5 more than 180° and less than 360° in curvature. Within itself, the cradle 3 defines a cylindrical cradling channel 6. Between its ends 24, the cradle 3 defines a slot 4 into the microphone cradling channel 6. The slot 4 provides a microphone entry path into the cradling channel 6, perpendicular to the central axis 5. The entry path permits a microphone, such as the microphone 20, to be placed into or removed from the cradling channel 6. Thus, a microphone, such as the microphone 20, may be placed into or removed from the cradling channel 6 without first being disconnected from its attached electrical output cable, such as cable 10.

When the microphone, such as microphone 20, is to be placed into the shock-mounting apparatus 15, the microphone body, such as microphone body 21, is held substantially parallel to the central axis 5 of the microphone cradling channel 6. The microphone body 21 is forced through the slot 4 by applying pressure along an axis 8 perpendicular to the central axis 5 of the cradling channel 6. As the microphone body 21 passes through slot 4, the cradle 3 flexes to receive the microphone body through slot 4 and into the cradling channel 6. The flexing of the cradle 3 permits the cradle ends 24 to spread apart to permit entry of the microphone into the cradling channel 6. Tips 7 are preferably located on the ends 24, are made from hard plastic to prevent scratching of the microphone body 21.

After passage of the microphone body 21 into the cradling channel 6, the cradle ends 24 and tips 7 pinch the microphone body 21 to hold it firmly in the cradling channel 6. Preferably, the cradle 3 is made from metal spring stock, most preferably spring tempered, high carbon steel.

Figure 5:
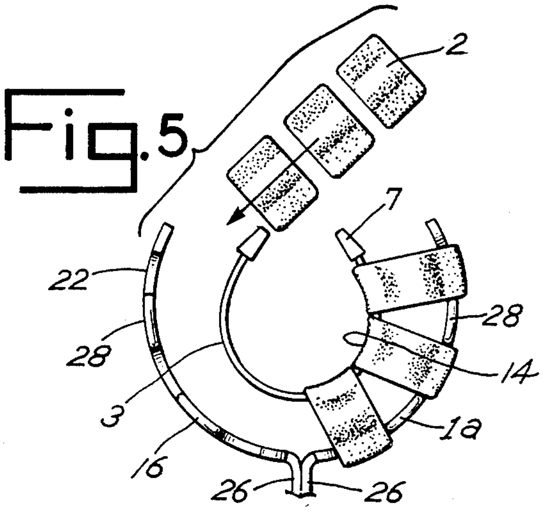

The mounting bracket 1, like the cradle 3, is arcuate, or partially annular. The diameter of the mounting bracket 1 is larger than that of the cradle 3 so that the cradle 3 may fit within the hollow interior of the mounting bracket 1 and be concentric with the mounting bracket 1. The mounting bracket 1 is made preferably from metal, most preferably aluminum. Referring to FIG. 1 and FIG. 5, the preferred mounting bracket 1 comprises two identical pieces 1*a*, each with a stem 26 and curved portion 28. The mounting bracket 1 is formed by joining the identical pieces 1*a* back-to-back at their stems 26 so that their curved portion 28 curve toward each other. Each stem 26 has an opening and a dimple (not shown) so that when they are joined, the dimple on one fits the opening on the other. Notches 22 are cut into the sides of the curved portions 28. The notches 22 are for receiving and holding the isolators 2 in place on the mounting bracket 1.

Figure 3:
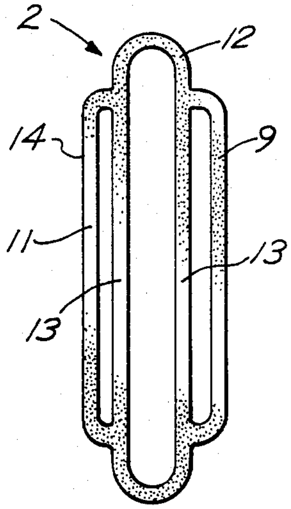
FIG. 3 is an end view of a rubber isolator of the preferred embodiment.
Figure 4:
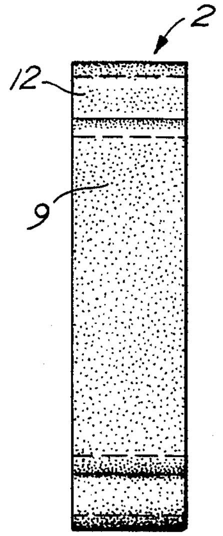
FIG. 4 is a side view of the rubber isolator, and, FIG. 5 is a view similar to FIG. 2, depicting the method of assembling the preferred embodiment.

Referring to FIG. 3 and FIG. 4, a representative isolator 2 is most preferably made from butyl rubber and is individually molded. Butyl rubber is highly resistant to degradation caused by contact with body oils, ozone, and petroleum products. Furthermore, butyl rubber has high internal damping. The isolator 2, from the end view of FIG. 3, has a large, central oval 12 flanked on either side by shorter elongated rectangles 9 and 11. The side rectangles 9 and 11 are joined to the central oval 12 so that each straight side 13 of the central oval 12 forms one of the straight sides of a rectangle 9 or 11.

The isolator 2 interconnects the cradle 3 with the mounting bracket 1 and at the same time isolates the cradle 3 from environmental vibration transmitted through the mounting bracket 1.

Referring to FIG. 5, the rectangles 9 of the isolators are stretched onto the mounting bracket 1. The rectangles 11 are stretched onto the cradle 3. One side of the rectangles 11 provide a friction surface 14 between the cradle 3 and the body of a cradled microphone. The surface 14 substantially prevents slippage of the microphone from a desired position in the cradle 3. The ends of the rectangles 9 fit into the notches 22 cut into the mounting bracket 1. The elongated sides of the rectangles 9 provide lateral stability to the cradle 3 relative to the mounting bracket 1. The sides substantially prevent the cradle 3 from twisting in relation to the mounting bracket 1 when the weight of a cradled microphone is not evenly distributed along the length of the cradling channel 6.

When a microphone is mounted in the apparatus 15 as depicted in FIG. 1, the isolators 2 are in a substantially relaxed condition, to afford maximum compliance for isolating the microphone from vibration. The isolators 2 are especially compliant in the axial direction, which is the direction of greatest sensitivity to vibration. This compliance is due in large measure to the rounded ends of the central ovals 12 of the isolators 2. When the mounting apparatus 15 experiences structure-borne vibration in the axial direction 5, the isolators 2 absorb the vibration of the mounting bracket 1 through a rolling motion of the isolators, i.e., a rolling compliance, rather than stretching of the isolators, i.e., a tension compliance.

Thus, environmental vibration transmitted to the mounting bracket 1 is substantially dissipated by the isolators 2. Significant transmission of structure-borne vibration to the cradle 3 is prevented, thereby reducing unwanted noise in the microphone electrical output signal.

The preferred shock-mounting apparatus 15 can cradle a microphone with a body about ¾" in diameter. To accomodate larger microphone bodies, the sizes of the mounting bracket 1 and cradle 3 can be increased, along with the number of isolators.

While in the foregoing, there has been provided a detailed description of particular embodiments of the present invention, it is to be understood that equivalents are to be included within the scope of the invention as claimed.

What is claimed is:

1. A shock-mounting apparatus for substantially vibrationally isolating a microphone comprising:
   means for cradling the microphone, the cradle means defining a microphone cradling channel and a slot into the channel, the cradle means being flexible along the slot;
   a mounting bracket; and
   means for
   (a) interconnecting the cradle means with the mounting bracket; and
   (b) substantially isolating the cradle means from environmental vibration transmitted to the mounting bracket;

whereby the cradle means flexes for receiving the microphone through the slot, cradles the microphone, and the apparatus substantially vibrationally isolates the microphone.

2. A shock-mounting apparatus as in claim 1, where the cradle means possesses a tip that slides along the microphone body as it enters the cradling channel whereby the microphone is received and held in the cradle means.

3. A shock-mounting apparatus as in claim 1, where said interconnecting means comprises at least one flexible, vibration absorbing isolator.

4. A shock-mounting apparatus for substantially vibrationally isolating a microphone comprising:

a spring cradle defining a microphone cradling channel, having tips on the end of the cradle and forming a slot into the channel, the cradle being flexible along the slot;

a mounting bracket; and a plurality of flexible, vibration absorbing isolators connecting the cradle with the mounting bracket and substantially isolating the cradle from environmental vibrations transmitted to the mounting bracket.

* * * * *